US008625006B2

(12) United States Patent
Stirling-Gallacher (10) Patent No.: US 8,625,006 B2
(45) Date of Patent: Jan. 7, 2014

(54) ACTIVE IMAGING DEVICE AND METHOD FOR SPECKLE NOISE REDUCTION

(75) Inventor: Richard Stirling-Gallacher, Stuttgart (DE)

(73) Assignee: Sony Corporation, Tokyo (JP)

( * ) Notice: Subject to any disclaimer, the term of this patent is extended or adjusted under 35 U.S.C. 154(b) by 205 days.

(21) Appl. No.: 13/185,061

(22) Filed: Jul. 18, 2011

(65) Prior Publication Data
US 2012/0019690 A1 Jan. 26, 2012

(30) Foreign Application Priority Data
Jul. 26, 2010 (EP) .................................. 10170770

(51) Int. Cl.
*H04N 5/217* (2011.01)
(52) U.S. Cl.
USPC ........................................ 348/241; 348/227.1
(58) Field of Classification Search
USPC .............................................. 348/241, 227.1
See application file for complete search history.

(56) References Cited

U.S. PATENT DOCUMENTS

| | | | |
|---|---|---|---|
| 5,497,777 A * | 3/1996 | Abdel-Malek et al. ....... | 600/443 |
| 5,619,998 A | 4/1997 | Abdel-Malek et al. | |
| 7,260,272 B2 | 8/2007 | Lin et al. | |
| 2002/0054713 A1* | 5/2002 | Matsuura ....................... | 382/275 |
| 2003/0076254 A1* | 4/2003 | Witten ............................ | 342/22 |
| 2004/0008904 A1* | 1/2004 | Lin et al. ........................ | 382/275 |
| 2005/0123212 A1* | 6/2005 | Gallagher et al. ............. | 382/254 |
| 2007/0053477 A1* | 3/2007 | Ning .................................. | 378/4 |
| 2009/0232269 A1* | 9/2009 | Hsieh et al. ........................ | 378/5 |

OTHER PUBLICATIONS

"Research and Improving on Speckle MMSE Filter Based on Adaptive Windowing and Structure Detection", IEEE International Conference on Vehicular Electronics and Safety 2005, pp. 251-256.*
"Fuzzy Thresholding in Wavelet Domain for speckle Reduction in Synthetic Aperture Radar Images", International Journal of Intelligent Systems and Technologies, Summer 2006, p. 252-265.*
S. Sudha, et al., "Speckle Noise Reduction in Ultrasound Images Using Context-based Adaptive Wavelet Thresholding", IETE Journal of Research, vol. 55, Issue 3, May-Jun. 2009, 9 pages.
"LabVIEW add-on: Advanced Signal Processing", National Instruments Corporation, 2010, 1 page.

(Continued)

*Primary Examiner* — Nicholas Giles
*Assistant Examiner* — Abdelaaziz Tissire
(74) *Attorney, Agent, or Firm* — Oblon, Spivak, McClelland, Maier & Neustadt, L.L.P.

(57) ABSTRACT

The present invention relates to an active imaging device and a corresponding device for imaging a scene, in particular for effectively reducing speckle noise. The proposed device comprises an illuminator that illuminates said scene with radiation, a radiation detector that detects radiation received from said scene in response to said illumination and that generates detection data from said detected radiation, an image constructor that constructs an image of said scene or one or more parts of said scene from the detection data, a noise reduction unit that processes said image by applying a one- or multi-dimensional transform to the complete image, to one or more parts of the image or to selected features in said image, and a transform selector that selects for the complete image, for one or more parts of the image or for selected features in said image a selected transform for application by said noise reduction unit resulting in the minimum speckle noise in the image, the respective part or the respective feature of the image.

13 Claims, 9 Drawing Sheets

(56) References Cited

OTHER PUBLICATIONS

Hai-Tao Fang, et al., "Noise reduction in lidar signal based on discrete wavelet transform", ScienceDirect, Optics Communications, Jan. 28, 2004, 2 pages.

U.S. Appl. No. 13/087,813, filed Apr. 15, 2011, Stirling-Gallacher.

Zhaohui Zeng, et al., "Bayesian Speckle Noise Reduction Using the Discrete Wavelet Transform", International Geo-science and Remote Sensing Symposium, IGARSS, Jul. 6-10, 1998, pp. 1-3.

Mario Mastriani, "Fuzzy Thresholding in Wavelet Domain for Speckle Reduction in Synthetic Aperture Radar Images", International Journal of Intelligent Systems and Technologies, 1;3, 2006, pp. 252-265.

M. Mastriani, et al., "Smoothing of coefficients in wavelet domain for speckle reduction in Synthetic Aperture Radar images", ICGST-GVIP Journal, vol. 5, Issue 6, Jun. 2005, pp. 1-8.

Y.H. Lu, et al., "Speckle Reduction by Wavelet Transform", IEEE, 1999, pp. 542-545.

\* cited by examiner

ACTIVE IMAGING DEVICE AND METHOD FOR SPECKLE NOISE REDUCTION

CROSS-REFERENCE TO RELATED APPLICATIONS

The present application claims priority of European patent application 10 170 770.1 filed on Jul. 26, 2010.

FIELD OF THE INVENTION

The present invention relates to an active imaging device and a corresponding method for imaging a scene. The present invention relates further to an image processing device and method for use in an active imaging device and method. Still further, the present invention relates to a computer program and to a computer readable non-transitory medium storing such a computer program. The present invention is particularly directed to the reduction of speckle noise.

BACKGROUND OF THE INVENTION

Speckle noise (also called "speckle" in the following) is a granular noise that inherently exists in and degrades the quality of images obtained by active imaging devices, such as active radars, and synthetic aperture radars (SARs). Speckle noise in conventional radar results from random fluctuations in the return signal from an object that is no bigger than a single image-processing element. It increases the mean grey level of a local area.

Various techniques have been proposed to reduce the effect of speckle for illumination systems such as laser projectors, but these techniques concentrate on removing the phase coherence of the transmitted signal, which help to decrease the speckle on the final image. Such techniques however cannot be used for an active imaging device, since it is important that the transmitted signal in an active imaging device maintains its phase coherence.

Further, it has been proposed to use the wavelet transform to reduce the effects of the noise by thresholding the high frequency components. M. Matrinsi et al, "Fuzzy Thresholding in Wavelet Domain for speckle Reduction in Synthetic Aperture Radar Images", International Journal of Intelligent Systems and Technologies, Summer 2006, p. 252-265 proposes to use a two dimensional (2D) discrete wavelet transform in the logarithmic domain in conjunction with a dynamic threshold which is controlled by a fuzzy controller. The wavelet transform is fixed and the examples show the performance with the Daubechies wavelet of order 15 is used. M. Matrinsi, A. E. Giraldez, "Smoothing of coefficients in wavelet domain for speckle reduction in synthetic Aperture Radar Images", Journal of ICGST-GVIP, Volume 5, Issue 6, June 2005 proposes to use a two dimensional discrete wavelet transform which uses a smooth shrink threshold and a directional filtering approach. The wavelet used is fixed. Y. H. Lu., et al, "Speckle Reduction by Wavelet transform", Microwave Conference 1999 Asia Pacific, Vol. 2, pp. 542-545 proposes to first use conventional filtering (in this case, Lee Filtering) and then use a 2D discrete wavelet transform using a soft threshold. The wavelet used is fixed and a transform based on the Daubechies wavelet of order 4 is used. Z. Zeng. et al, "Bayesian Speckle Noise Reduction Using the Discrete Wavelet Transform", International Geo-science and Remote Sensing Symposium IGARSS '98, Seattle, 6-10 Jul., 1988 proposes to use a two-dimensional discrete wavelet transform in the logarithmic domain with multiple levels of decomposition. Bayesian estimation is then used to set the thresholds for the different levels. The wavelet used is fixed and a Daubechies wavelet of order 4 is used.

BRIEF SUMMARY OF INVENTION

It is an object of the present invention to provide an active imaging device and method, by which speckle noise occurring during active imaging can be effectively reduced with small efforts. It is a further object of the present invention to provide a corresponding image processing device and method as well as a corresponding computer program for implementing said image processing method and a computer readable medium.

According to an aspect of the present invention there is provided an active imaging device for imaging a scene, comprising:

an illuminator that illuminates said scene with radiation, a radiation detector that detects radiation received from said scene in response to said illumination and that generates detection data from said detected radiation, an image constructor that constructs an image of said scene or one or more parts of said scene from the detection data, a noise reduction unit that processes said image by applying a one- or multi-dimensional transform to the complete image, to one or more parts of the image or to selected features in said image, and a transform selector that selects for the complete image, for one or more parts of the image or for selected features in said image a selected transform for application by said noise reduction unit resulting in the minimum speckle noise in the image, the respective part or the respective feature of the image.

According to a further aspect of the present invention there is provided an image processing device for use in an active imaging device as defined above and as proposed according to an aspect of the present invention, said image processing device comprising a corresponding image constructor, noise reduction unit and transform selector.

According to still further aspects a computer program comprising program means for causing a computer to carry out the steps of the method according to the present invention, when said computer program is carried out on a computer, as well as a computer readable non-transitory medium having instructions stored thereon which, when carried out on a computer, cause the computer to perform the steps of the method according to the present invention are provided.

Preferred embodiments of the invention are defined in the dependent claims. It shall be understood that all the claimed devices and methods, the claimed computer program and the claimed computer readable medium have similar and/or identical preferred embodiments as the claimed active imaging device and as defined in the dependent claims.

The inventors of the present invention have found that the known speckle reduction noise technique using a wavelet transform having a fixed specific wavelet type and a fixed order shows disadvantages. In particular, where the distance between the scene (or object) and the receiver (i.e. the radiation detection means) may change and the distribution of roughness may change from scene to scene (or from object to object) or across a given scene (or across a given object), the optimum transform type and/or order to obtain best performance may change. Using a constant wavelet transform, speckle reduction performance would be degraded since the best wavelet order and type may not be used.

Hence, it is proposed according to an aspect of the present invention to illuminate the scene (including an object to be imaged, e.g. a person), i.e. to transmit radiation onto the scene (or only the object). At the receiver (or radiation detection means and its connected elements) radiation received from said scene in response to said illumination, from which detection data are generated, which are then used to construct an image of the scene (or one or more parts, e.g. image portions image features). A one- or multi-dimensional (preferably two-dimensional) transform is then applied to the complete image, to one or more parts of the image or to selected features in said image. Finally, a transform is selected for application by said noise reduction means which results in the minimum speckle noise in the image, the respective part or the respective feature of the image, i.e. said transform is then finally applied by the noise reduction means for processing the generated image.

The present invention thus alleviates the above mentioned disadvantages of the known methods and devices by using a number of different transforms (e.g. a bank of those transforms) and, according to an embodiment, chooses the most suitable one based on simple measurements of the image after processing it by the transform. The present invention is thus different from the above described known methods and devices.

The idea underlying the present invention is not just to try many different transform at random. For instance, in a handheld device the number of transforms provided (e.g. in a bank) will be limited (due to limited complexity/power consumption) and may be pre-selected beforehand, depending upon the environments/scenarios in which the scanner is to be used. In addition to describing that different transforms can be used for reducing speckle, criteria are preferably provided for performing the selection.

Dynamically selecting the transform on a dynamic basis as proposed will result in better performance. For many traditional speckle reduction problems the parameters of the system are fixed. For such systems the use of one transform may be sufficient. For example, the known speckle reduction methods refer to images where the distances between the transmitter and objects to be studied only vary by a small percentage of the overall distance (i.e. SAR (Synthetic Aperture Radar) imaging of earth surface) and many other parameters for the system are fixed. However, the performance gain and the use of dynamically selecting the transform type has not been described or suggested. There is also no prior art describing any relationship between speckle noise reduction performance, transform type, image type and system parameters. In addition to describing that dynamically selecting different transform can be used for reducing speckle, criteria for performing the selection are proposed in an embodiment.

To increase processing speed the different transforms may be implemented in parallel, so the processing delay for this idea is not significantly longer than using just one transform. Modern digital signal processing (e.g. using FPGAs or ASICs) is able to realise the implementation of many different parallel transforms.

Preferably, as proposed in an embodiment, a number of different wavelet transforms is provided for selection. However, other transforms may be used as well, e.g. other transforms for image noise reduction such as Discrete Cosine Transforms (DCT), Contourlet Transforms and polynominal Transforms, may be applied as well. In an embodiment, not only transforms of a certain class (such as different wavelet transforms, but also transforms of different orders may be provided.)

According to still a further aspect of the present invention there is provided an active imaging device for imaging a scene, comprising:

an illumination means for illuminating said scene with radiation, a radiation detection means for detecting radiation received from said scene in response to said illumination and for generating detection data from said detected radiation, an image construction means for constructing an image of said scene or one or more parts of said scene from the detection data, a noise reduction means for processing said image by applying a one- or multi-dimensional transform to the complete image, to one or more parts of the image or to selected features in said image, and a transform selection means for selecting for the complete image, for one or more parts of the image or for selected features in said image a selected transform for application by said noise reduction means resulting in the minimum speckle noise in the image, the respective part or the respective feature of the image.

According to a further aspect of the present invention there is provided an image processing device for use in an active imaging device as defined above and as proposed according to an aspect of the present invention, said image processing device comprising a corresponding image construction means, noise reduction means and transform selection means.

BRIEF DESCRIPTION OF THE DRAWINGS

These and other aspects of the present invention will be apparent from and explained in more detail below with reference to the embodiments described hereinafter. In the following drawings

DETAILED DESCRIPTION OF THE INVENTION

Active imaging systems are becoming increasingly more popular at ultrasonic, microwave, millimetre and terahertz frequencies for a number of applications including medical and security applications.

The arrangement of transmitter and receiver in an active imaging system may take on many different forms, but in the most general sense active systems use a transmitter (generally an "illumination means") to illuminate (i.e. emit radiation to) the object (or item, in general the "scene") to be studied by transmitting at the frequency (or frequencies) of interest and analyse the received signal due to reflections and/or transmission characteristics of the object. The present invention is primarily directed to active imaging using the reflected signal, although the idea may also be used in active imaging using the transmitted signal.

Figure 1A:
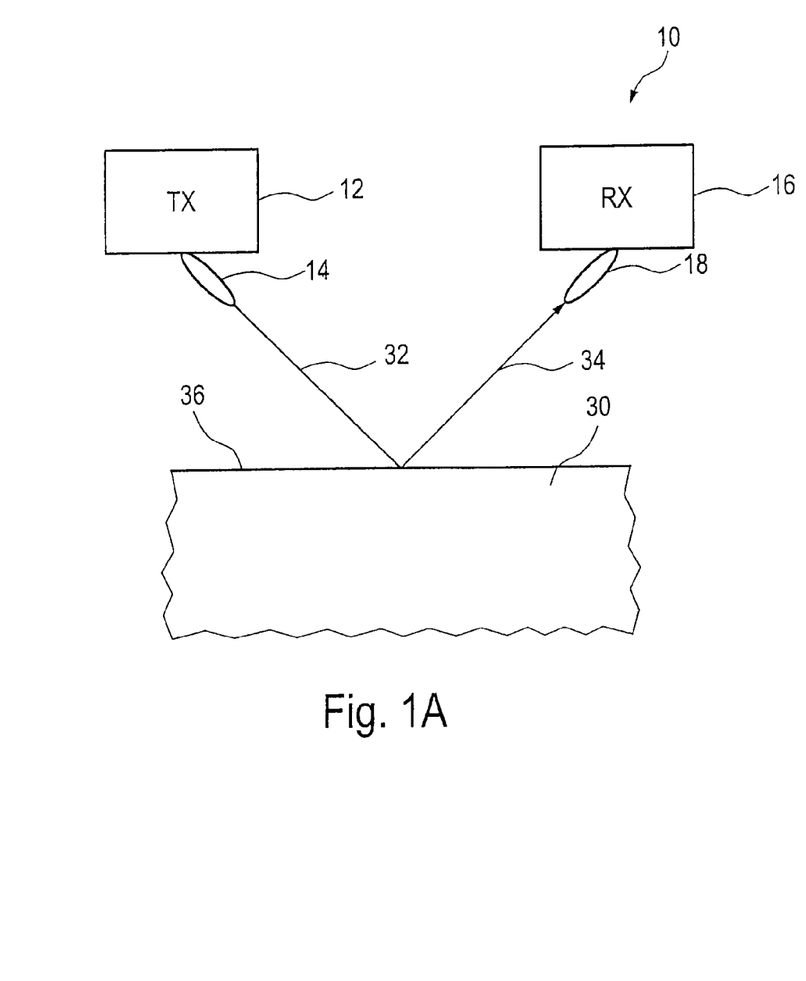
FIG. 1 shows a first and a second embodiment of an active imaging device.
Figure 1B:
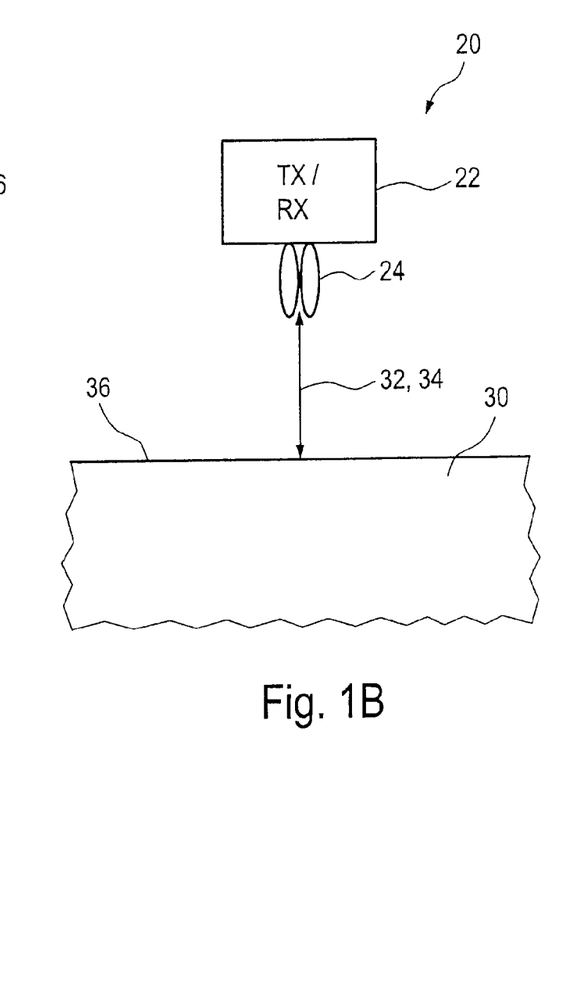

The general layout of simple arrangements of an active imaging device is schematically depicted in FIGS. 1A and 1B. FIG. 1A shows a bi-static arrangement 10 in which the transmitter 12 (labelled as TX), including a transmit antenna 14, and the receiver 16 (labelled as RX), including a receive antenna 18, are not collocated. FIG. 1B shows a mono-static arrangement 20, in which both the transmitter and the receiver 22, including one or more (separate or shared) antenna(s) 24, are collocated. In these simple general arrangements 10, 20 beam antennas 14, 18, 24 for both transmitter and receiver are shown, which may be implemented in many different ways.

The object 30 (generally, the scene, which usually includes the object, e.g. a person or item) is illuminated by radiation 32, and the reflected radiation 34 is detected, from which detected radiation a radiation signal is generated for further processing. In these simple arrangements 10, 20 it is generally assumed that the transmitted wave of the radiation 32 is hitting a flat surface 36 of the object and that no significant amount of transmitted energy penetrates into the object 30 (or item). The active imaging device could be using any type of transmission scheme (i.e. pulse based, multi-carrier, frequency modulated continuous wave (FMCW), etc.) and could be using any frequency.

This case of not penetrating the object or item's surface would typically be similar to an aircraft fuselage being detected by air traffic control radar or an active imaging security body scanner where the transmitted wave does not penetrate the human skin.

Figure 2A:
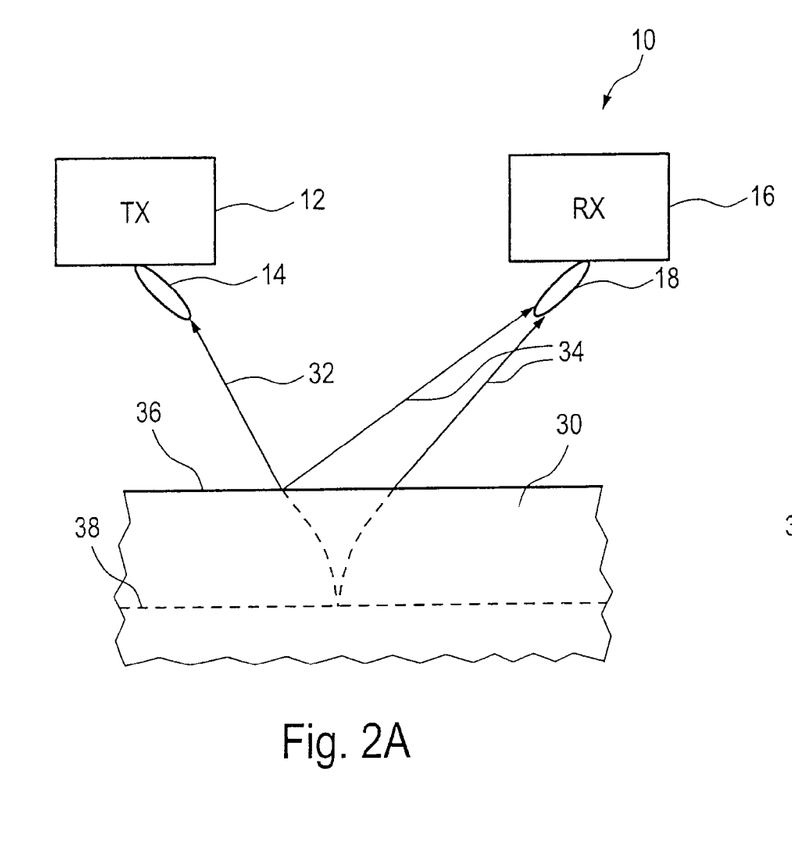
FIG. 2 shows the first and second embodiment of an active imaging device for imaging an object having an intermediate layer.
Figure 2B:
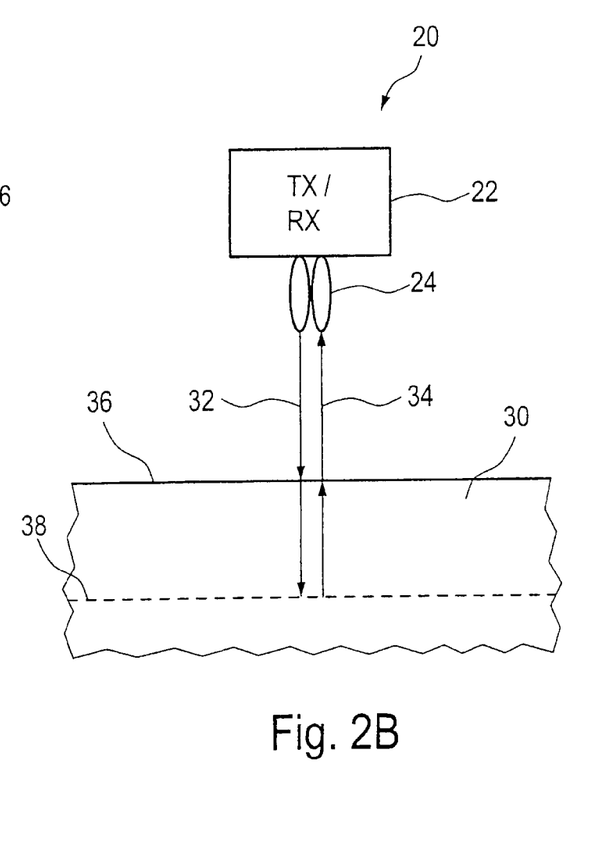

The arrangements 10, 20 of the imaging device used for imaging an object 30 (or item) having multiple reflecting layers 36, 38 are shown in FIGS. 2A and 2B. Here, both arrangements 10, 20 are generally bi-static. Typical example of this multi-layer case would be in medical diagnosis when ultrasound (<10 MHz) or Ultra-wideband (typically 3-10 GHz) frequencies are used.

Figure 3:
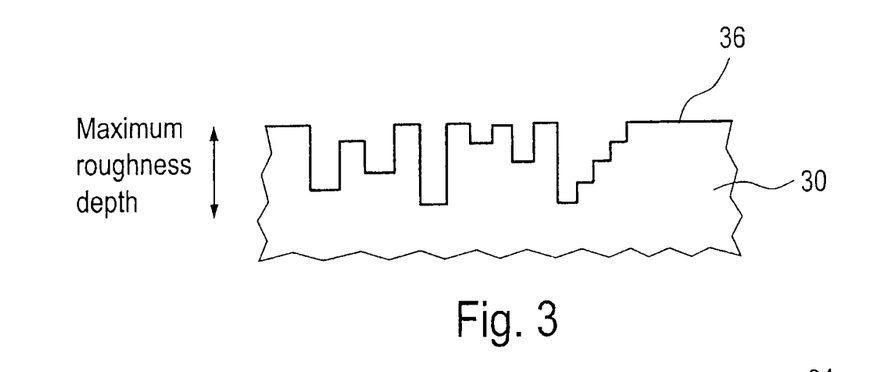
FIG. 3 shows a diagram illustrating a rough surface of an object.

For all of these systems, where the reflected signal is analysed at the receiver, the received signal (and resulting final image) may be degraded by a multiplicative noise known as speckle noise. Speckle noise is generated by the summing of multiple reflections (which have different phase shifts) and occurs when the object has a rough reflecting surface or layer. A simple model of roughness is shown in FIG. 3. Such a roughness could occur at the surface 36 of the object 30 or could occur at one of the intermediate layers 38 of the object 30 as shown in FIG. 2.

Figure 4A:
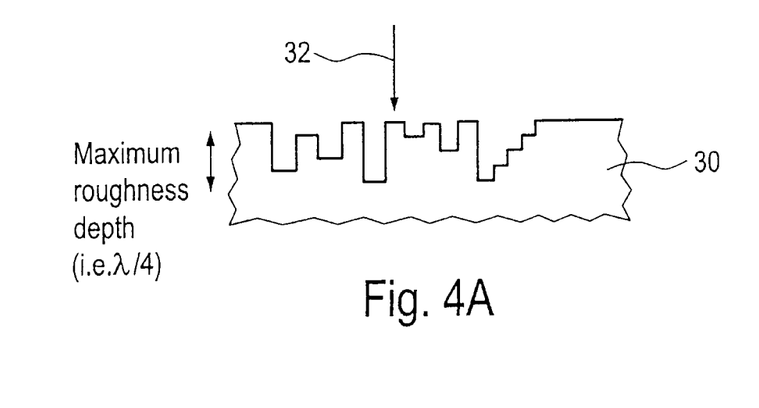
FIG. 4 shows a diagram illustrating the generation of speckle noise on a rough surface.
Figure 4B:
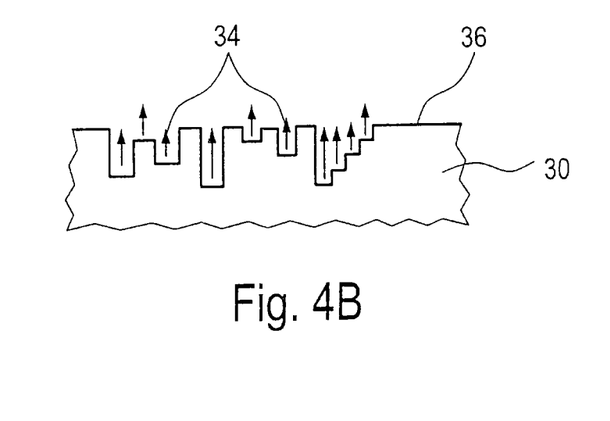

The reason, why the speckle noise occurs, is illustrated with reference to FIG. 4. In FIG. 4A it is assumed that the transmitted signal 32 is hitting the object surface 36 (or immediate layer) at 90°. FIG. 4B shows the reflected signal 34. Since the surface 36 (or immediate layer) is rough, the total reflected signal 34 is the summation of all the different reflections which can be received by the receiver antenna. Since many of the individual reflected signals 34 had to travel different distances (due to the roughness), they all have different phase shifts and the total power of reflected signal can be reduced.

If some reflected signals have to travel half a wavelength ($\lambda/2$) longer than other reflected signals, the difference in phase can be 180° and the reflections can totally cancel each other out. In FIG. 4 the example maximum roughness is ($\lambda/4$) and the signals being reflected back from the lowest part in the roughness do indeed have to travel ($\lambda/2$) longer than waves which are being reflected back from the top of the surface 36.

As an object is scanned therefore (e.g. by moving the Tx and Rx beam antenna directions, or by moving the transmitter and receiver units, or by electronically sweeping the antenna beams or radiation patterns), there can be a huge variation in the received signal depending upon the roughness of the surfaces being illuminated, the roughness of the surfaces being received and the illuminated frequency. Hence, to optimise the visibility of all objects in the image, the speckle noise needs to be reduced. Many different techniques have been proposed to combat speckle including using multiple frequencies and various filtering techniques as mentioned above, all having different advantages and disadvantages. According to the present invention, a new approach is proposed by which the disadvantages of the known techniques are overcome.

The new approach presented by the present invention is based on the use of a transform of the image constructed from acquired detection data. Preferably, a wavelet transform is applied as such a transform. Hence, before the details of the present invention are explained, details of using a wavelet transform shall be discussed.

The wavelet transform is a commonly known and used technique for reducing noise in images. The wavelet transform is commonly implemented in a discrete form (using sampled digital signals), but can also be implemented in a continuous form using analogue components. The following explanation focuses on the discrete form of wavelet transform to explain the concepts, but it shall be noted that embodiments of the present invention can also be implemented using a wavelet transform (or other transform) in a discrete or a continuous (non-discrete) way.

Typically a one-dimensional discrete wavelet transform (1D DWT) is used to remove noise from a line and a two-dimensional wavelet transform (2D DWT) is used to remove noise from a 2D image.

Figure 5:
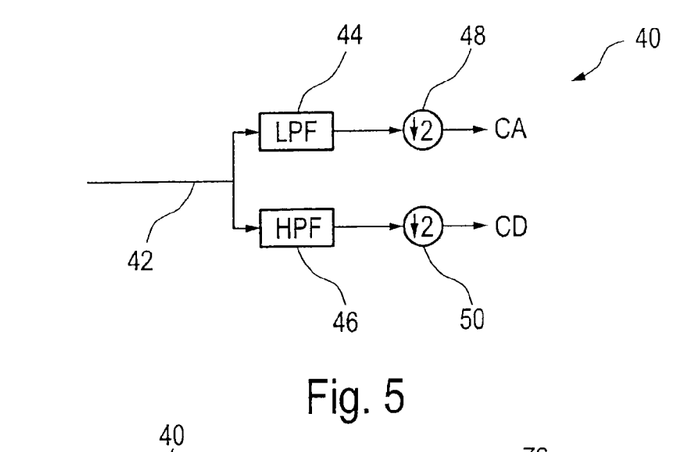
FIG. 5 shows a first embodiment of a 1D wavelet transform unit with one layer.

An example of a one-dimensional DWT unit 40 is shown in FIG. 5, where the discrete input 42 is passed to a low pass filter (LPF) 44 and a high-pass filter (HPF) 46. Subsequently, down-sampling of the result of both filters 44, 46 by a factor of 2 is performed in down-sampling units 48, 50. Depending upon the specific wavelet which is chosen, the pair of low pass and high pass filters 44, 46 would have a certain impulse response and a corresponding frequency response. Therefore, by choosing different wavelets for the DWT unit 40, different pairs of low pass and high pass filters 44, 46 are formed. At the output of the low pass filter path approximate (low frequency) coefficients CA are provided, at the output of the high pass filter path detailed (high frequency) coefficients CD are provided.

Figure 6:
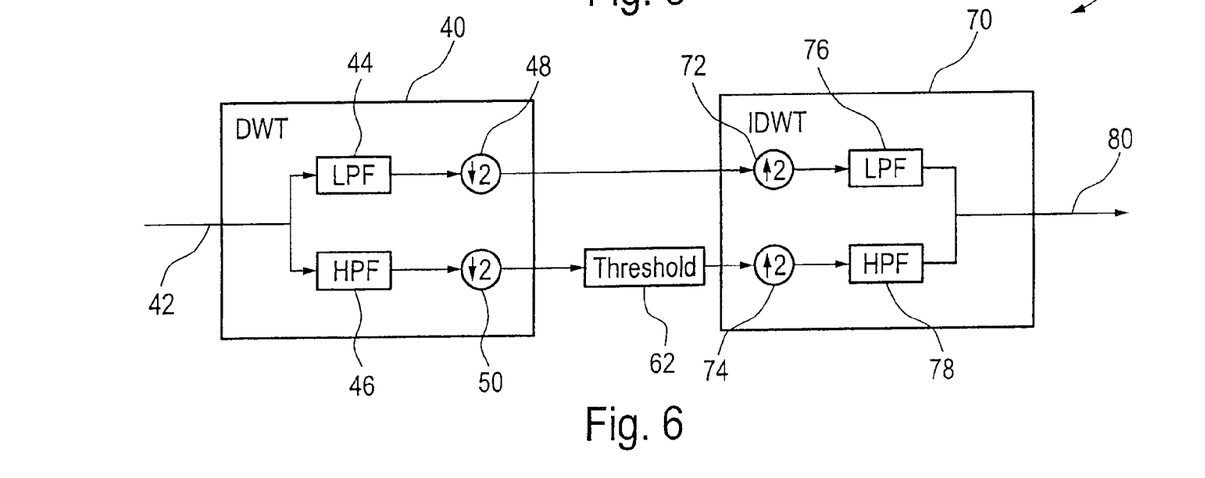
FIG. 6 shows a first embodiment of a 1D noise reduction unit.

Typically to remove the higher frequency noise components the output of the high pass filter is passed to a threshold unit (which may be implemented in a variety of different ways), which removes (or cuts off) the amplitudes of high frequency components above a predetermined threshold (for the amplitudes) and then subsequently passed to a corresponding IDWT as shown in FIG. 6 showing an embodiment of a noise reduction unit 60 comprising a one-dimensional DWT unit 40 as shown in FIG. 5, a threshold unit 62 in the high pass filter path and an inverse DWT (IDWT) unit 70. The IDWT unit 70 comprises up-sampling units 72, 74 for up-sampling by a factor of 2 in each path and again a low pass filter 76 and a high pass filter 78. The filter outputs are then combined resulting in the noise filtered output 80.

Figure 7:
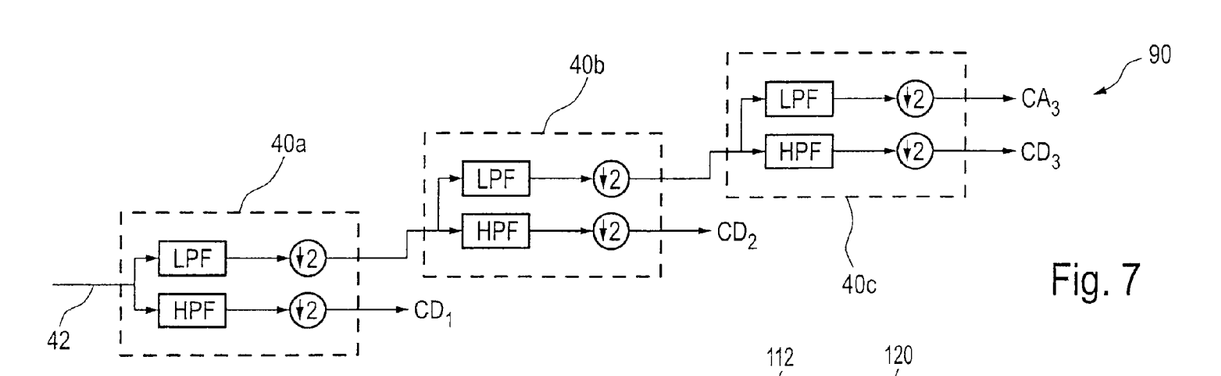
FIG. 7 shows a second embodiment of a 1D wavelet transform unit with multiple layers.

FIGS. 5 and 6 show a one level DWT unit. However, the DWT unit may also have multiple levels of decomposition. Such an embodiment of a DWT unit 90 with three levels is shown in FIG. 7. Such a DWT unit 90 comprises a cascade of three DWT units 40 as shown in FIG. 5, wherein the output of the low pass filter path of a previous DWT unit is provided as input to the subsequent DWT unit. The first level DWT unit 40a provides as output detailed coefficients CD), the second level DWT unit 40b provides as output detailed coefficients $CD_2$, and the third level DWT unit 40c provides as output detailed coefficients $CD_3$ and approximate coefficients $CA_3$.

Figure 8:
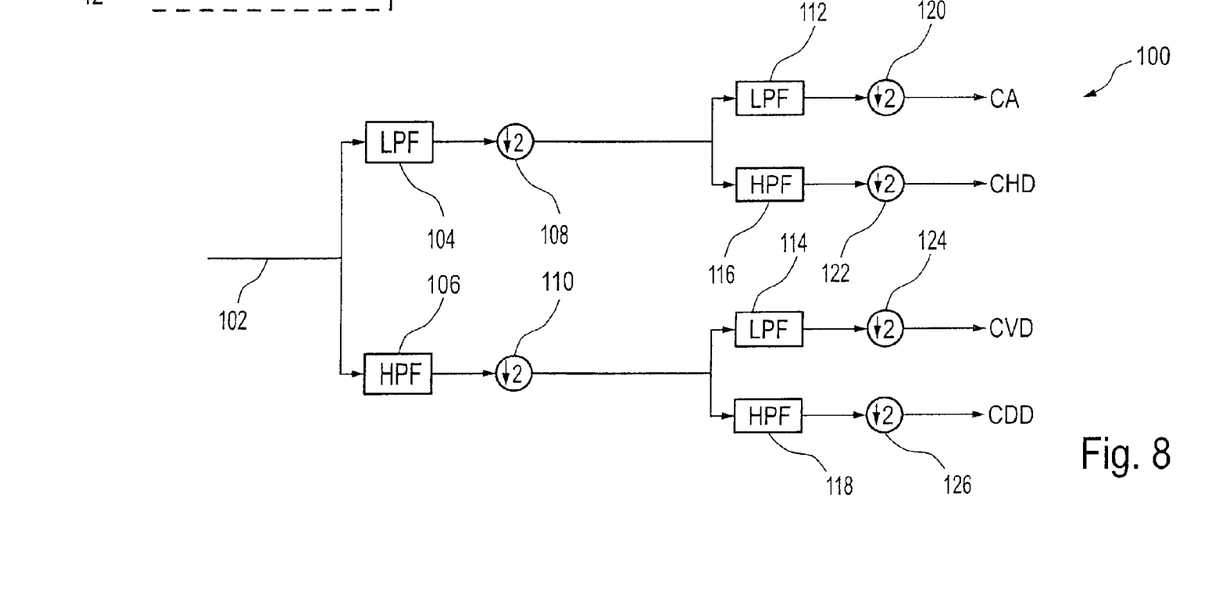
FIG. 8 shows a first embodiment of a 2D wavelet transform unit with one layer.

Typically, a one dimensional DWT is used to filter a line of an image. To filter a two-dimensional image (instead of a line), a 2D DWT unit is typically used. An example of a 2D DWT unit 100 (for one level) is shown in FIG. 8. The input 102 of this transform is an area of the image containing a set of rows and columns. It can be seen that the rows of the image are filtered first by a low pass filter 104 and a high pass filter 106, followed by down-sampling units 108, 110 for down-sampling the columns. Subsequently, in each pass the columns of the image are filtered by low pass filters 112, 114 and high pass filters 116, 118, followed by down-sampling units 120, 122, 124, 126 for down-sampling the rows.

In the same way as the 1D DWT, the high pass and low pass filter has an impulse response and frequency response corresponding to the chosen wavelet. From FIG. 8 it can be seen that such a 2D DWT unit 100 has four outputs which correspond to the approximate (low frequency) coefficients CA, detailed horizontal (high frequency) coefficients CHD for horizontal components, detailed vertical (high frequency) coefficients CVD for vertical components, and detailed diagonal (high frequency) coefficients CDD for diagonal components.

Figure 9:
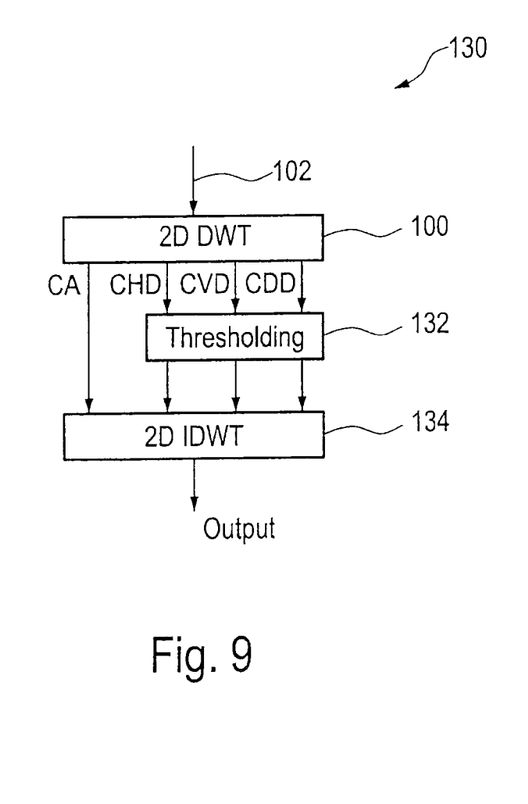
FIG. 9 shows a first embodiment of a 2D noise reduction unit.

A typical application of the 2D DWT to reduce noise is shown in the FIG. 9 depicting a schematic block diagram of a 2D noise reduction unit 130. Here it can be seen that the high frequency components of the signal (detailed components for the horizontal, vertical and diagonal components), i.e. the output of the 2D DWT unit 100 are passed to a threshold unit 132 before being converted back to the normal domain via the 2D IDWT unit 134.

Figure 10:
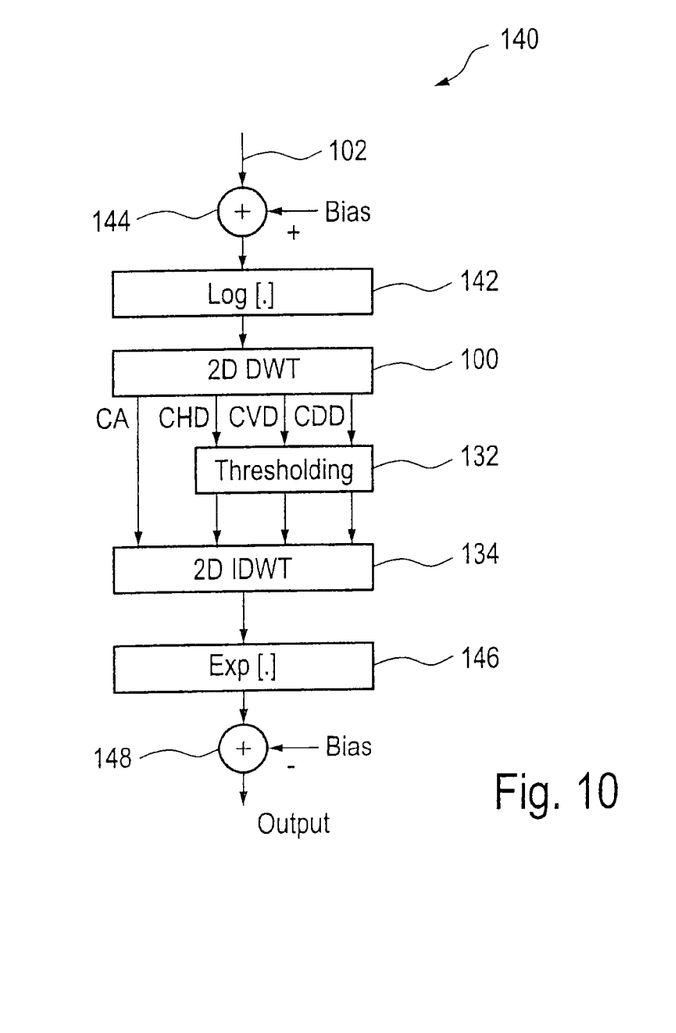
FIG. 10 shows a second embodiment of a 2D noise reduction unit.

Another embodiment of a 2D noise reduction unit 140 to reduce noise is shown in FIG. 10. Here it can be seen that the input 102 is first passed to a logarithmic unit 142, (in this case the natural logarithm) via a biasing unit 144 and that the output of the 2D IDWT unit 134 is passed to an inverse logarithmic unit 146 (in this case the exponential function) via a biasing unit 148. This is done so that the wavelet transform is performed in the logarithmic domain, which converts the multiplicative speckle noise to an additive noise, which can be more effectively reduced by the wavelet transform. The biasing units 144, 1148 are provided so that the input of the logarithmic unit 142 and inverse logarithms unit 146 do not have to compute a non positive (zero or negative) value input.

Since speckle noise is a multiplicative noise, known filtering approaches typically use a DWT pair or the 2D DWT pair (i.e. a pair meaning a wavelet transform/inverse wavelet transform as generally provided in a noise reduction unit) in the logarithmic domain as shown in FIG. 10, since by taking the logarithm, the multiplicative noise is converted from a multiplicative noise to an additive noise. The basic challenge with using the DWT to reduce speckle noise is that the low and high pass filter contained in the DWT (and corresponding IDWT) are determined by the chosen wavelet function. By choosing a different wavelet types and/or order, the impulse response and frequency response of the low and high pass filters in the DWT are changed. It is, hence, an element of the present invention to use a number (at least two) of different transform pairs, preferably wavelet transform pairs (for instance with corresponding threshold units) to reduce the speckle noise. The different wavelet pairs may have a different wavelet order and/or a different wavelet type and may or may not have different threshold algorithms.

Figure 11:
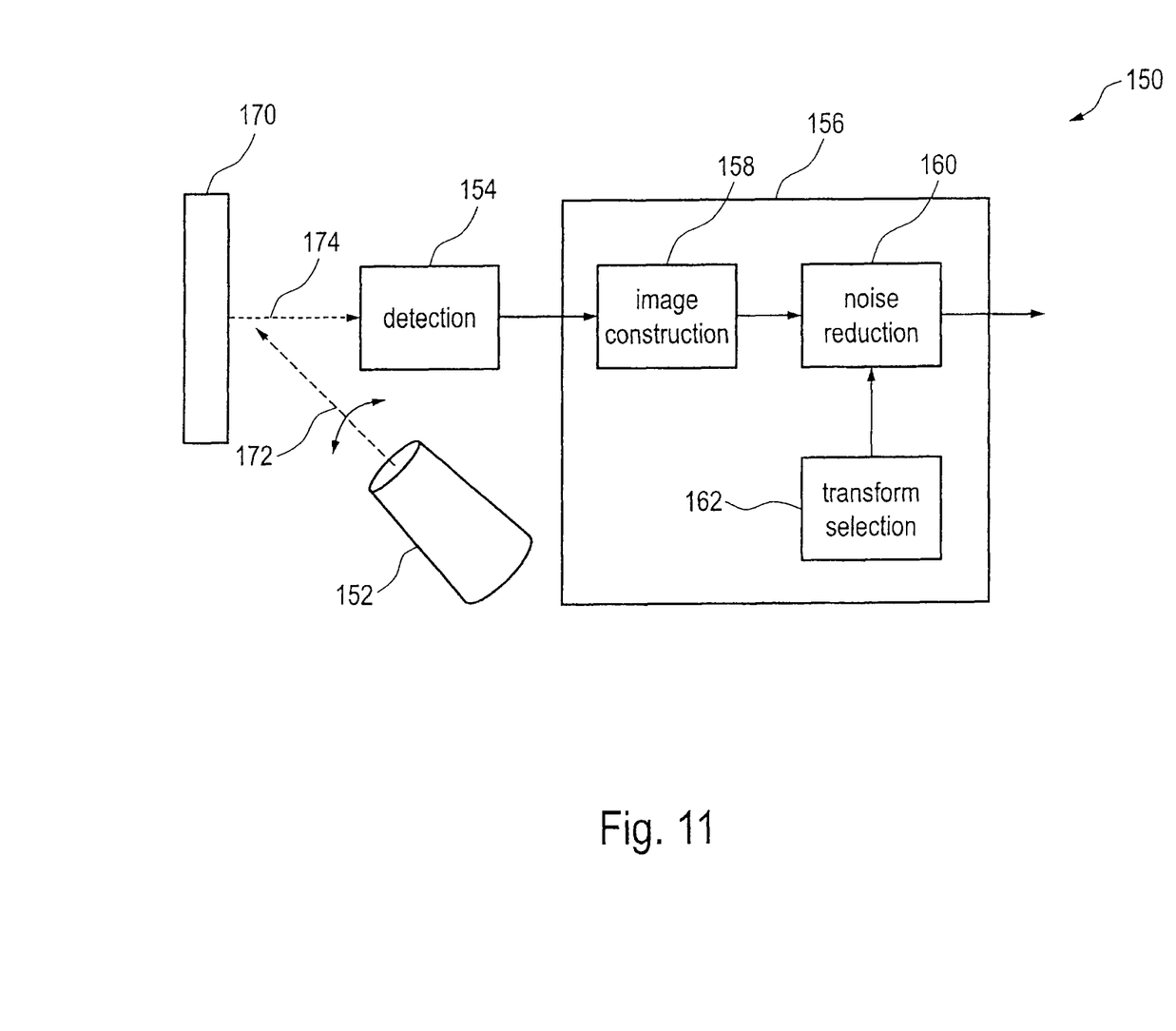
FIG. 11 shows a first embodiment of an active imaging device according to the present invention.

A first embodiment of an active imaging device 150 for imaging a scene 170, e.g. including an object, is schematically depicted in FIG. 11. The device 150 comprises an illumination means 152, e.g. a transmitter 12 including a transmit antenna 14 as shown in FIGS. 1 and 2, for illuminating said scene 170 with radiation 172, e.g. with radiation at multiple illumination frequencies, an illumination frequency range covering multiple illumination frequencies or a single illumination frequency. A radiation detection means 154, e.g. a receiver 16 including a receive antenna 18 as shown in FIGS. 1 and 2, is provided for detecting radiation 174 received from said scene 170 in response to said illumination 172 and for generating detection data from said detected radiation 174. Said detection data are then processed in an image processor 156.

It shall be noted here that the scanning of the scene 170 may be achieved in different ways, e.g. by (electronically moving the Tx and/or Rx beam antenna directions and/or by (mechanically) moving the transmitter and/or receiver units or by any other means, e.g. beam forming antennas or mirrors. Further, instead of a separate transmitter and receiver, a common transceiver (e.g. as used in a monostatic radar) may be used here. Still further, multiple transmitters and/or multiple receivers may be applied as well to increase the scanning time.

The processor 156 includes an image construction means 158 for constructing an image of said scene 170 or one or more parts of said scene 170 (e.g. interesting image portions or image features) from the detection data. Further, a noise reduction means 160 is provided for processing said image by applying a one- or multi-dimensional (e.g. two-dimensional) transform to the complete image, to one or more parts of the image or to selected features in said image. Still further, a transform selection means 162 is provided for selecting for the complete image, for one or more parts of the image or for selected features in said image a selected transform for application by said noise reduction means 160 resulting in the minimum speckle noise in the image, the respective part or the respective feature of the image.

The elements 158, 160, 162 of said processor 156 may be implemented in hardware and/or software. Their functions and effects will be explained below in more detail. The noise reduction means may particularly be implemented as illustrated in FIGS. 5 to 10.

Thus, in an embodiment of the present invention different transform pairs (e.g. different wavelet transform) pairs are used to filter the complete image or a part of the image or a feature of the image and the wavelet pair with the best speckle reduction performance is chosen to be used for forming the final image.

To choose the wavelet pair with the best speckle reduction performance a wavelet selection rule is preferably used by the transform selection means 162. There are many possibilities for this wavelet selection rules, but some possible selection rules are as follows:

a) Choose the wavelet transform pair which results in an output (which may be the complete image, a part of an image, or feature of the image) which has the lowest variance (or standard derivation). In this way, the variance (or standard derivation) is measured at the output of the different wavelet transform pairs; or b) Choose the wavelet transform pair which results in an output which has the highest signal to noise ratio (SNR). This may be measured as the mean of the output divided by the variance, or may be measured be any other suitable measure of signal to noise ratio.

Since the level of speckle depends, among others, upon the surface or layer roughness, different parts or features of an object will have different levels of speckle at a given illumination frequency. Smooth parts or features of an object will have very low levels of speckle across a wide set of illumination frequencies, while rough parts of an object will have very high level of speckle when the roughness distribution has a mean value close to $\lambda/4$, where $\lambda$ is the wavelength of the illumination frequency.

Figure 12:
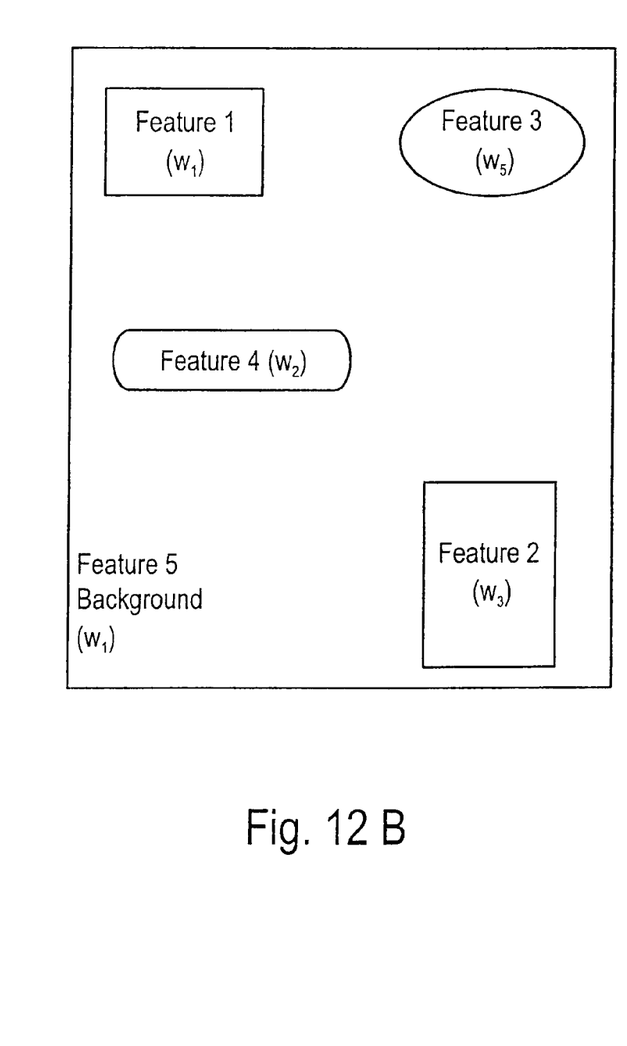
FIG. 12 shows a diagram illustrating feature selection according to an embodiment of the present invention.

Depending upon the exact distribution of the roughness for each feature, using a different transform for noise reduction may be advantageous. Hence, one idea of the present invention is therefore that to obtain a minimum level of speckle across a whole image, the best set of transforms for selected (or each) feature(s) are found and these are then applied to that feature in the final image. This is schematically shown in FIG. 12, wherein FIG. 12A shows an example scene including five features and FIG. 12B shows the same scene, wherein for each feature the best transform has been selected from available transforms $w_1$ to $w_5$. As can be seen, different features may have different best transforms.

Figure 13:
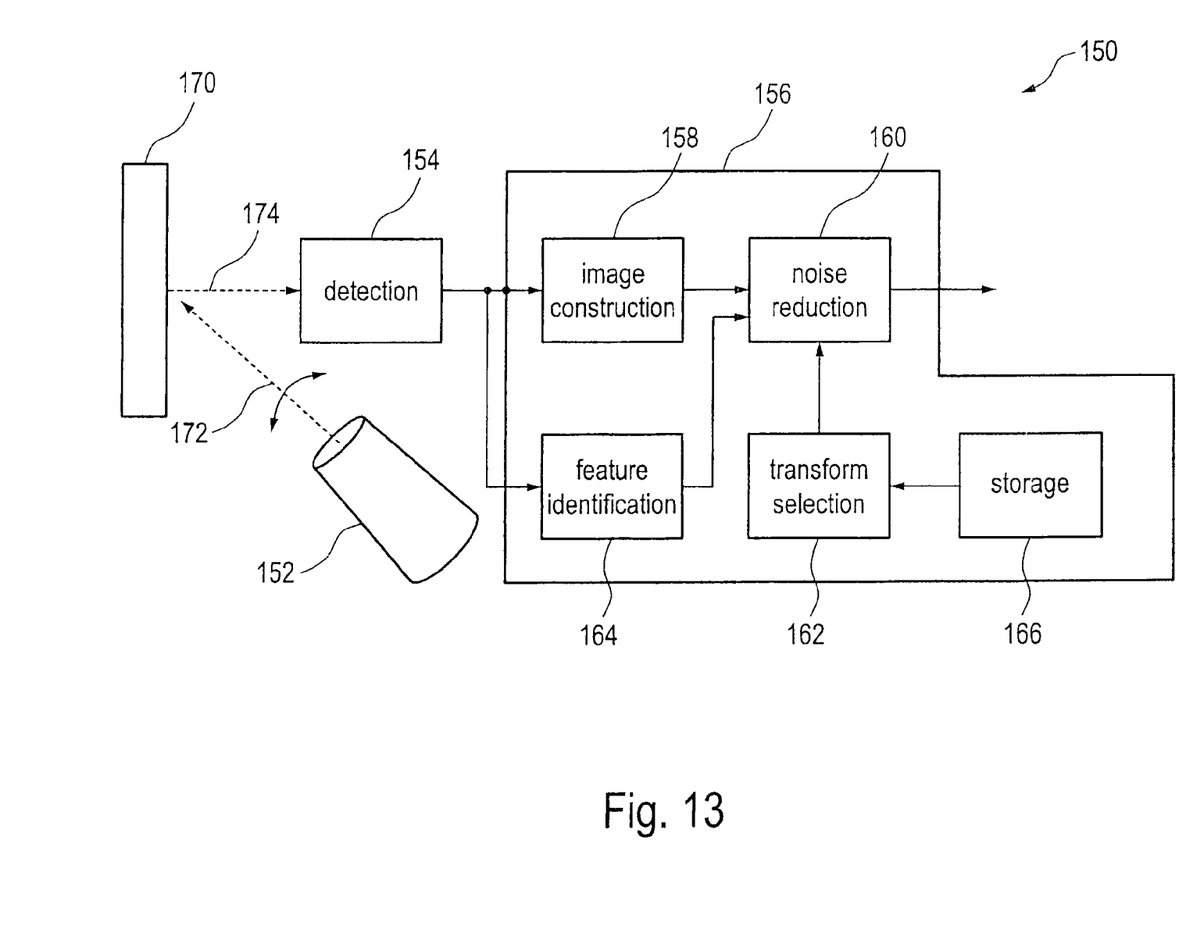
FIG. 13 shows a second embodiment of an active imaging device according to the present invention.

In the case that the different wavelet pairs shall filter different features of the image, the feature will be first identified using a feature identification algorithm in a feature identification unit 164 as provided in another embodiment as shown in FIG. 13. There are many algorithms for performing a feature identification, which may be applied here. An example of a feature identification algorithm is generally described in Zengguo et al., "Research and Improving on Speckle MMSE Filter Based on Adaptive Windowing and Structure Detection", IEEE International Conference on Vehicular Electronics and Safety 2005, pp. 251-256, but there are many other possibilities. Preferably, in this case the transform selection means 162 is adapted for separately selecting said one or more selected transforms for each individual identified feature.

Further, in this embodiment a storage 166 is provided (which is independent of the feature identification means 164 and may also be provided in other embodiments. In said storage 166 a number of transforms of different type, different order, different coefficients and/or different thresholds, in a number of wavelet transforms of different wavelet type and/ or different wavelet order, are stored for selection by said transform selection means 162.

While generally, different transforms may be applied according to the present invention, in a preferred embodiment said noise reduction means 160 is adapted for applying a one- or multi-dimensional wavelet transform to the complete image, to one or more parts of the image or to selected features in said image. Further, said transform selection means 162 is adapted for selecting for the complete image, for one or more parts of the image or for selected features in said image (generally, depending on whether the wavelet transform is applied to the complete image, to one or more parts of the image or to selected features in said image) a selected wavelet transform for application by said noise reduction unit 160.

For the wavelet transform, there are many different types, different orders and different thresholds (or adaptive thresholds) that may be provided for selection and used according to preferred embodiments of the present invention. They may also distinguish by different filter coefficient, but these are directly related to the wavelet type and order. It could, for instance, be that across a 2D image consisting of different features (with corresponding different roughness distributions) different wavelet types may perform differently and that for the same feature at different distances (or zooms), different orders of the same wavelet perform differently.

In the following a list of possible types of wavelet transforms with the number of orders normally considered is provided. In many cases the number of orders possible is actually higher than the number listed here, but the order number here is number of order which are typically considered.

Haar (1 order),
Daubechies (20 orders),
Symlets (20 orders),
Coiflets (5 orders),
Bi-orthogonal (6 orders with various number of sub orders),
Reverse Bi-orthogonal (6 orders with various number of sub orders),
Meyer (1 order)
Discrete Meyer (1 order)
Mexican Hat (1 order)
Morlet (1 order)
Complex Morlet (1 order)
Guassian (8 orders)
Complex Gaussian (8 orders)
Complex Shannon (5 orders)
Complex Frequency B-Spline (6 orders).

In embodiments of the invention, not necessarily all, but only some of said transforms may be used.

The number of different transforms provided for selection, e.g. in a bank, generally depends upon the capabilities of the device. If, for instance, the invention is used in a small handheld scanner, the number of different transforms in the bank, that can be stored and processed is limited, and it would be better to pre-select the set of transforms in the bank in advance. This pre-selection phase may take into account certain properties of the scanner (i.e. half power beam width, frequency of operation etc.), the scenarios (i.e. range of distance of objects to be scanned, set of likely materials to be scanned etc.) in which the inherent scanner will be used.

The set of transforms in the bank may be completely different for a handheld scanner used for security scanner at airport than for a handheld ultrasound medical scanner. For a handheld scanner, it is envisaged that the processing could be done be in real time, so there is no significant delay experienced by the user. To increase processing speed the different transforms may be implemented in parallel, so the processing delay for using the present invention is not significantly longer than using just one transform. Modern digital signal processing (using FPGA (field programmable gate arrays) and ASIC (application specific integrated circuits)) is more than capable to realise the implementation of many parallel transforms.

In summary, a main advantage of the proposed invention, compared to known methods and devices, is that speckle reduction performance is improved for a wide range of scenarios, since the best transform, e.g. the best wavelet transform pair (wavelet transform/inverse wavelet transform), is chosen from available transforms, e.g. from a bank of wavelet transform pairs.

The invention can be applied in a wide range of applications and technical fields, in particular all areas where active imaging of a scene is used and where speckle noise generally is a problem. These fields particularly include the fields of medical imaging, e.g. by use of ultrasound, active radiometry or security scanning. The applicable frequencies may be selected from a wide range, particularly dependent on the kind of application. Said wide frequency range ranges generally from 20 kHz up to hundreds of THz. Preferred frequency ranges are in the millimetre wavelength range.

The invention has been illustrated and described in detail in the drawings and foregoing description, but such illustration and description are to be considered illustrative or exemplary and not restrictive. The invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

A computer program may be stored/distributed on a suitable non-transitory medium, such as an optical storage medium or a solid-state medium supplied together with or as part of other hardware, but may also be distributed in other forms, such as via the Internet or other wired or wireless telecommunication systems.

Any reference signs in the claims should not be construed as limiting the scope.

The invention claimed is:

1. An active imaging device for imaging a scene, comprising:
    an illuminator that illuminates said scene with radiation,
    a radiation detector that detects radiation received from said scene in response to said illumination and that generates detection data from said detected radiation,
    an image constructor that constructs an image of said scene or one or more parts of said scene from the detection data,
    a noise reduction unit that processes said image by applying two different pairs of a one- or multi-dimensional transform to the complete image, to one or more parts of the image or to selected features in said image, and
    a transform selector that selects for the complete image, for one or more parts of the image or for selected features in said image selected pairs of transforms for application by said noise reduction unit resulting in the minimum speckle noise in the image, the respective part or the respective feature of the image, said transform selector separately selecting said selected pairs of transforms based on a predetermined transform selection rule, and said transform selector determining the variance and/or standard deviation of the complete image, of the one or more parts of the image or of the selected features in said image and for selecting the pairs of transforms resulting in the lowest variance and/or lowest standard deviation for the complete image, for one or more parts of the image or for selected features in said image.

2. The active imaging device as claimed in claim 1, wherein said noise reduction unit is adapted for applying the two different pairs of a one- or multi-dimensional wavelet transform to the complete image, to one or more parts of the image or to selected features in said image, and wherein said transform selector is adapted for selecting for the complete image, for one or more parts of the image or for selected features in said image the selected pairs of wavelet transforms for application by said noise reduction unit.

3. An active imaging device for imaging a scene, comprising:
    an illuminator that illuminates said scene with radiation,
    a radiation detector that detects radiation received from said scene in response to said illumination and that generates detection data from said detected radiation,
    an image constructor that constructs an image of said scene or one or more parts of said scene from the detection data,
    a noise reduction unit that processes said image by applying two different pairs of a one- or multi-dimensional transform to the complete image, to one or more parts of the image or to selected features in said image, and
    a transform selector that selects for the complete image, for one or more parts of the image or for selected features in said image selected pairs of transforms for application by said noise reduction unit resulting in the minimum speckle noise in the image, the respective part or the respective feature of the image, said transform selector separately selecting said selected pairs of transforms based on a predetermined transform selection rule, and said transform selector determining the mean and/or signal-to-noise ratio of the complete image, of the one or more parts of the image or of the selected features in said image and for selecting the pairs of transforms resulting in the highest mean and/or highest signal-to-noise ratio for the complete image, for one or more parts of the image or for selected features in said image.

4. The active imaging device as claimed in claim 1, further comprising a feature identification unit for analyzing said detection data and identifying individual features in said scene.

5. The active imaging device as claimed in claim 4, wherein said transform selector is adapted for separately selecting said selected pairs of transforms for each individual identified feature.

6. The active imaging device as claimed in claim 1, further comprising a storage for storing a number of transforms of different type, different order, different coefficients and/or different thresholds, in particular storing a number of wavelet transforms of different wavelet type and/or different wavelet order, for selection by said transform selector.

7. The active imaging device as claimed in claim 1, wherein the device is an ultrasound device, a security scanner or an active radiometric imaging device.

8. An active imaging method for imaging a scene, comprising:
    illuminating said scene with radiation,
    detecting radiation received from said scene in response to said illumination,
    generating detection data from said detected radiation,
    constructing an image of said scene or one or more parts of said scene from the detection data,
    processing said image by applying two different pairs of a one- or multi-dimensional transform to the complete image, to one or more parts of the image or to selected features in said image, and
    selecting for the complete image, for one or more parts of the image or for selected features in said image selected pairs of transforms for application by said step of processing resulting in the minimum speckle noise in the image, the respective part or the respective feature of the image, said selecting including separately selecting said selected pairs of transforms based on a predetermined transform selection rule, and determining the variance and/or standard deviation of the complete image, of the one or more parts of the image or of the selected features in said image and for selecting the pairs of transforms resulting in the lowest variance and/or lowest standard deviation for the complete image, for one or more parts of the image or for selected features in said image.

9. A non-transitory computer readable medium having instructions stored thereon which, when carried out on a computer, cause the computer to perform the method as claimed in claim 8.

10. An active imaging device for imaging a scene, comprising:
   illumination means for illuminating said scene with radiation,
   radiation detection means for detecting radiation received from said scene in response to said illumination and for generating detection data from said detected radiation,
   image construction means for constructing an image of said scene or one or more parts of said scene from the detection data,
   noise reduction means for processing said image by applying two different pairs of a one- or multi-dimensional transform to the complete image, to one or more parts of the image or to selected features in said image, and
   transform selection means for selecting for the complete image, for one or more parts of the image or for selected features in said image selected pairs of transforms for application by said noise reduction means resulting in the minimum speckle noise in the image, the respective part or the respective feature of the image, said transform selection means separately selecting said selected pairs of transforms based on a predetermined transform selection rule, and said transform selection means determining the variance and/or standard deviation of the complete image, of the one or more parts of the image or of the selected features in said image and for selecting the pairs of transforms resulting in the lowest variance and/or lowest standard deviation for the complete image, for one or more parts of the image or for selected features in said image.

11. The active imaging device as claimed in claim 10, wherein the transform selection means selects two pairs of transforms by selecting a pair of each of two transforms from among the following transforms: Harr, Daubechies, Symlets, Coiflets, Bi-orthogonal, Reverse Bi-orthogonal, Meyer, Discrete Meyer, Mexican Hat, Morlet, Complex Morlet, Gaussian, Complex Gaussian, Complex Shannon, and Complex Frequency B-Spline.

12. The active imaging device as claimed in claim 1, wherein the transform selector selects two pairs of transforms by selecting a pair of each of two transforms from among the following transforms: Harr, Daubechies, Symlets, Coiflets, Bi-orthogonal, Reverse Bi-orthogonal, Meyer, Discrete Meyer, Mexican Hat, Morlet, Complex Morlet, Gaussian, Complex Gaussian, Complex Shannon, and Complex Frequency B-Spline.

13. The active imaging method as claimed in claim 8, wherein the selecting selects two pairs of transforms by selecting a pair of each of two transforms from among the following transforms: Harr, Daubechies, Symlets, Coiflets, Bi-orthogonal, Reverse Bi-orthogonal, Meyer, Discrete Meyer, Mexican Hat, Morlet, Complex Morlet, Gaussian, Complex Gaussian, Complex Shannon, and Complex Frequency B-Spline.

* * * * *